United States Patent [19]

Tokumura

[11] Patent Number: 5,080,969

[45] Date of Patent: Jan. 14, 1992

[54] COMPOSITE FRICTION MATERIAL FOR BRAKES

[75] Inventor: Hiroshi Tokumura, Hanyu, Japan

[73] Assignees: Akebono Brake Industry Co., Ltd., Tokyo; Akebono Research and Development Centre Ltd., Hanyu, both of Japan

[21] Appl. No.: 584,113

[22] Filed: Sep. 18, 1990

[30] Foreign Application Priority Data

Nov. 17, 1989, [JP] Japan ................................. 1-298955

[51] Int. Cl.$^5$ ................................................. B32B 5/16
[52] U.S. Cl. ....................................... 428/327; 428/328; 428/332; 428/339; 428/402; 428/409; 523/149; 523/155; 523/156; 523/157; 523/158; 524/509
[58] Field of Search ............... 428/524, 339, 327, 328, 428/332, 402, 409; 524/427, 509; 523/155, 158, 149, 157, 156; 521/54; 188/251 R, 251 A, 251 M

[56] References Cited

U.S. PATENT DOCUMENTS 3,899,050  8/1975  Savary et al. .................. 188/251 A
4,173,681  11/1979  Durriew et al. .................. 428/409

Primary Examiner—Merrell C. Cashion, Jr.
Assistant Examiner—Hoa T. Le
Attorney, Agent, or Firm—Oblon, Spivak, McClelland, Maier & Neustadt

[57] ABSTRACT

The invention relates to a composite friction material for brakes comprising a main friction material containing thermosetting resin as a binder, and a layer of high friction material with a higher friction coefficient than said main friction material for exhibiting a high braking power on initial application, which high friction layer is provided on the surface of said main friction material and contains a phenol resin of not more than 5 wt. %.

4 Claims, 1 Drawing Sheet

COMPOSITE FRICTION MATERIAL FOR BRAKES

BACKGROUND OF THE INVENTION

The present invention relates to a friction material for brakes, particularly, to a composite friction material having made it possible to achieve a high braking power from initial application.

Recently, accompanying with the speed of cars, high braking power from initial application has been required also for the friction material for disc brake.

In order to achieve such high braking power from initial application, the organic components in the surface area of friction material have been eliminated so far by burning the surface of friction material with hot plate, gas flame or the like for improving said initial effect.

By such method, however, there have been inconveniences that increased production processes of friction material result in a cause for cost-up, that burning unevenness generates in surface layer, that flatness of friction surface becomes poor, and the like.

As a result of extensive investigations in view of this situation, a composite friction material for brakes with improved initial braking power on braking has been developed by the invention.

SUMMARY OF THE INVENTION

The invention provides a composite friction material for brakes comprising a main friction material containing thermosetting resin as a binder and a layer of friction material with high friction coefficient for exhibiting a high braking power on initial application, which is provided on the surface of said main friction material and contains organic component of not more than 5 wt. %.

DETAILED DESCRIPTION OF THE INVENTION

The invention was obtained as a result of detailed investigations on the friction material provided with conventional surface burning, and has a feature that, if the content of organic component in the surface layer is not more than 5%, the initial braking power roughly equivalent to that of the friction material provided with surface burning can be achieved. Here, the organic component indicates principally phenol resin as a binder required for molding the friction material. The reason for adding metal oxide is because of that, by containing it on the side of surface layer of friction material as a harder component than the partner member of friction engagement, initial braking power is more enhanced. Besides, as said metal oxides, MgO, $SiO_2$, $Al_2O_3$, etc. can be applied, but, since excessive addition thereof is injurious to other performances such as brake noise, wear of rotor being a partner member of friction, etc., it is necessary to balance the additional level.

Further, the invention has an advantage that the lowerings in quality such as burning unevenness, decreased flatness, etc. are also improved due to the elimination of conventional surface burning process.

Figure 1:
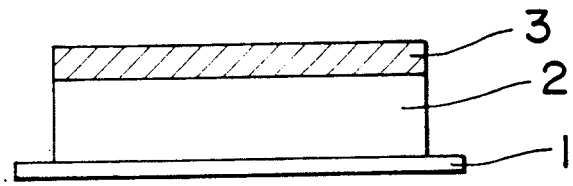
FIG. 1 is an illustration diagram showing the constitution of the composite friction material of the invention.

For the production of such composite friction material, it is only necessary to take the same method as in the production of double layer type friction material from the time of perliminary molding. Namely, as shown in FIG. 1, the back plate (1) side is molded as a main friction material (2) having usual formulation components and the surface layer side is molded with inventive high friction coefficient (Hi-$\mu$) material (3) having organic component of not more than 5%, which is then submitted to thermal molding. Thereafter, this is further submitted to heat treatment and surface grinding to obtain final product. Besides, the thickness of this Hi-$\mu$ material (3) may be adjusted appropriately according to the requirement, but it is effective to be around 1 to 3 mm.

In following, examples of the invention will be illustrated.

EXAMPLE

Figure 2:
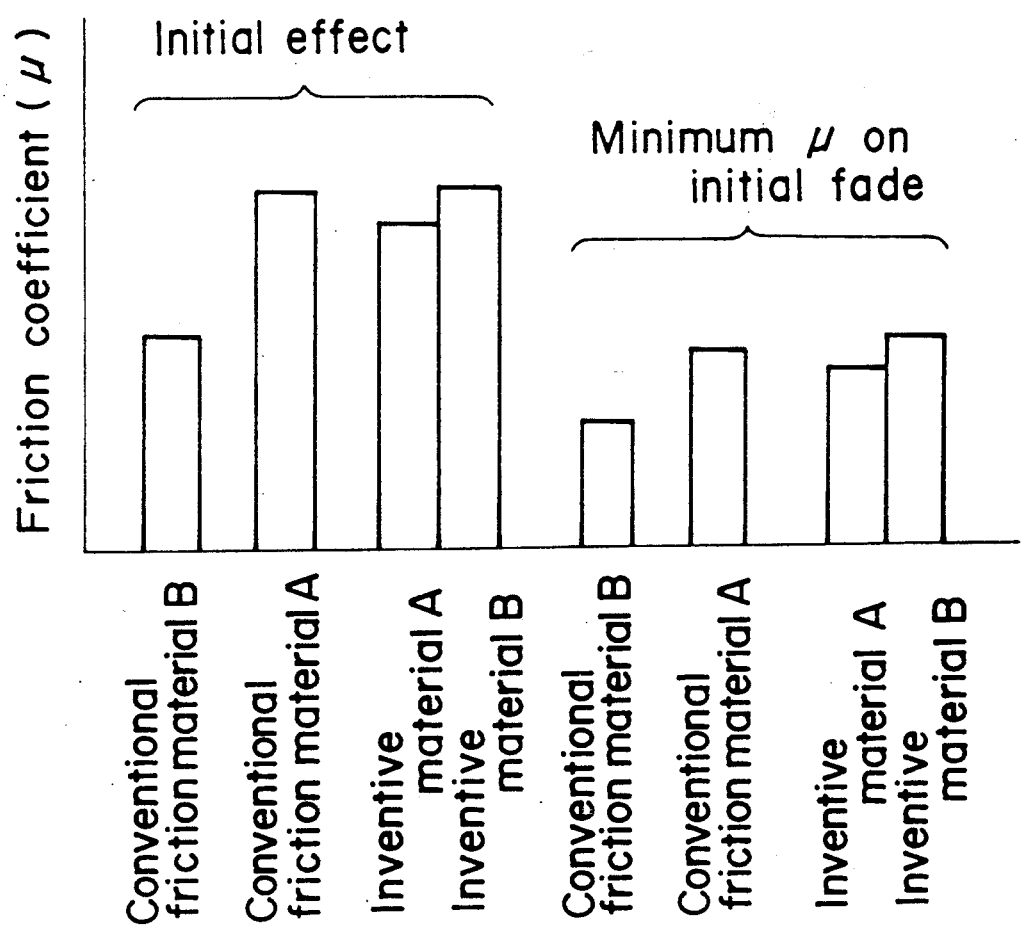
FIG. 2 is a measured diagram showing the results of friction test.

The inventive material A and the invention material B were made, wherein Hi-$\mu$ material ① and Hi-$\mu$ material ② having compositions shown in Table 1 were formed respectively on the surface layer side of main friction material having a composition similarly shown in Table 1. The friction test thereof was performed to measure the friction coefficient $\mu$ as an initial effect and the minimum friction coefficient $\mu$ of initial fade, the results of which are shown in FIG. 2.

Moreover, with regard to a conventional friction material used only the main friction material shown in Table 1 as it is, conventional friction material A experienced in surface burning in the final process and conventional friction material B without surface burning were prepared, then the friction test thereof was performed similarly to above. The results are put down in Fig. 2.

TABLE 1

| Formulating material (wt. %) | Main friction material | Hi-$\mu$ material ① | Hi-$\mu$ material ② |
|---|---|---|---|
| Phenol resin | 8 | 4 | 4 |
| Rubber particles | 5 | — | — |
| Polyamide fibers | 5 | — | — |
| Steel fibers | 20 | 25 | 25 |
| Graphite | 10 | 10 | 10 |
| Barium sulfate | 35 | 40 | 37 |
| Iron particles | 5 | 6 | 6 |
| Silica | 2 | 3 | 6 |
| Vermiculite | 10 | 12 | 12 |
| Friction material | Conventional friction material | Inventive material A | Inventive material B |

As evident from FIG. 2, with the inventive materials A and B, high braking power equivalent to that of conventional friction material experienced in surface burning was achieved in all cases. Moreover, because of stabilized flatness, the dispersion between measured values was found to be less.

As described above, in accordance with the composite friction material for brakes of the invention, such conspicuous effects are exerted that the initial braking power equivalent to that of friction material experienced in conventional surface burning can be achieved, thus the surface burning process can be omitted compared with the case of conventional one permitting to aim at cost-down, that the burning unevenness in the surface of friction material is eliminated and the flatness of surface is improved to give an excellent product in quality, and others.

What is claimed is:

1. A composite friction material for brakes comprising a main friction material containing thermosetting resin as a binder, and a layer of high friction material with a higher friction coefficient than said main friction material for exhibiting a high braking power on initial application, which high friction layer is provided on the surface of said main friction material and contains a phenol resin of not more than 5wt. %.

2. The composite friction material for brakes according to claim 1, wherein said layer of high friction material with higher friction coefficient contains an appropriate amount of metal oxide having a higher hardness than that of a partner member of friction engagement.

3. The composite friction material for brakes according to claim 1 or 2, wherein said layer of higher friction material with higher friction coefficient has a thickness of 1 to 3 mm.

4. The composite friction material for brakes according to claim 1 or 2, wherein said layer of high friction material with higher friction coefficient has a formulation consisting of phenol resin of 4 wt. %, steel fibers of 25 wt. %, graphite of 10 wt. %, barium sulfate of 37 to 40 wt. %, iron particles of 6 wt. %, silica of 3 to 6 wt. % and vermiculite of 12 wt. %.

* * * * *